United States Patent
Potratz et al.

(10) Patent No.: US 8,929,055 B2
(45) Date of Patent: Jan. 6, 2015

(54) SNAP-IN AND SNAP-ON NEUTRAL RAIL ASSEMBLIES IN A PLUG-ON NEUTRAL LOAD CENTER

(71) Applicant: Schneider Electric USA, Inc., Palatine, IL (US)

(72) Inventors: Jason D. Potratz, Raleigh, NC (US); David R. Pearson, Palo, IA (US); William J. Broghammer, Anamosa, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 217 days.

(21) Appl. No.: 13/720,089

(22) Filed: Dec. 19, 2012

(65) Prior Publication Data

US 2014/0168861 A1     Jun. 19, 2014

(51) Int. Cl.
| | |
|---|---|
| H02B 1/056 | (2006.01) |
| H01B 5/02 | (2006.01) |
| H01B 5/00 | (2006.01) |
| H01B 1/20 | (2006.01) |
| H02B 1/20 | (2006.01) |

(52) U.S. Cl.
CPC . H02B 1/056 (2013.01); H02B 1/20 (2013.01)
USPC ........... 361/640; 361/634; 361/637; 361/645; 361/652; 174/68.2; 174/71 B; 174/149 B; 174/166 S; 200/293; 200/295

(58) Field of Classification Search
USPC ......... 361/600, 611, 622, 624, 627, 634, 636, 361/637, 640, 641, 644, 645, 648, 651, 652, 361/656, 658; 174/67, 68.2, 71 B, 72 B, 174/149 B, 166 S; 24/107, 17 AP, 16 PB, 24/293, 295, 297; 248/223.21, 224.51, 248/225.11, 222.12, 220.21; 200/293, 295, 200/297, 307, 303, 318
See application file for complete search history.

(56) References Cited

U.S. PATENT DOCUMENTS

| | | | |
|---|---|---|---|
| 2,914,708 | A | 11/1959 | Harold |
| 3,218,519 | A | 11/1965 | Casey |
| 3,339,119 | A | 8/1967 | Stanback et al. |
| 3,349,292 | A | 10/1967 | Meacham |
| 4,079,439 | A | 3/1978 | Coles et al. |

(Continued)

OTHER PUBLICATIONS

Eaton Product Brochure, Plug into Savings with the CH Plug-on Neutral Loadcenter and AFCI and GFCI Breakers (2006); 4 pages.

*Primary Examiner* — Michail V Datskovskiy
(74) *Attorney, Agent, or Firm* — Locke Lord LLP

(57) ABSTRACT

A plug-on load center featuring snap-in or snap-on neutral rails that are retained securely in the load center on or between a dielectric barrier without requiring any fasteners and assembled by installing the dielectric components and neutral rail along the same direction orthogonal to a rear wall of an enclosure that houses the load center. The snap-in configurations feature dielectric barriers with fingers that create a snap-fit connection between the neutral rail and a shield member. The neutral rail is forced between the fingers, which separate and then snap back to their original position once the neutral rail is fully seated in the dielectric barrier. The snap-on configurations feature a neutral rail that is snapped onto the dielectric barrier and retained in the load without any fasteners. The barrier can include retention members that snap-fit into corresponding features of the neutral rail when it is installed onto the barrier.

12 Claims, 10 Drawing Sheets

(56) References Cited

U.S. PATENT DOCUMENTS

| | | | |
|---|---|---|---|
| 4,118,754 A * | 10/1978 | Duggan | 361/637 |
| 4,142,225 A | 2/1979 | Diersing et al. | |
| 4,167,769 A | 9/1979 | Luke et al. | |
| 4,251,851 A | 2/1981 | Diersing et al. | |
| 4,449,296 A * | 5/1984 | Luke et al. | 29/883 |
| 4,667,269 A | 5/1987 | Morby et al. | |
| 4,916,574 A * | 4/1990 | Hancock et al. | 361/649 |
| 5,134,543 A | 7/1992 | Sharp et al. | |
| 5,179,491 A | 1/1993 | Runyan | |
| 5,245,302 A | 9/1993 | Brune et al. | |
| 5,250,918 A | 10/1993 | Edds et al. | |
| 5,302,787 A | 4/1994 | Edds et al. | |
| 5,337,211 A * | 8/1994 | Reiner et al. | 361/637 |
| 5,343,356 A * | 8/1994 | Hancock | 361/637 |
| 5,450,282 A | 9/1995 | Webber et al. | |
| 5,640,294 A * | 6/1997 | Caggiano et al. | 361/637 |
| 6,266,232 B1 | 7/2001 | Rose et al. | |
| 6,459,570 B1 | 10/2002 | Buchanan | |
| 7,245,480 B2 * | 7/2007 | Dixon et al. | 361/634 |
| 7,417,849 B2 * | 8/2008 | Dixon et al. | 361/634 |
| 7,449,645 B1 | 11/2008 | Flegel | |
| 7,508,653 B2 | 3/2009 | Parlee | |
| 7,772,723 B1 | 8/2010 | Flegel | |
| 7,957,122 B2 * | 6/2011 | Sharp | 361/673 |
| 2008/0003850 A1 | 1/2008 | Seff et al. | |
| 2008/0158787 A1 | 7/2008 | Parlee | |

\* cited by examiner

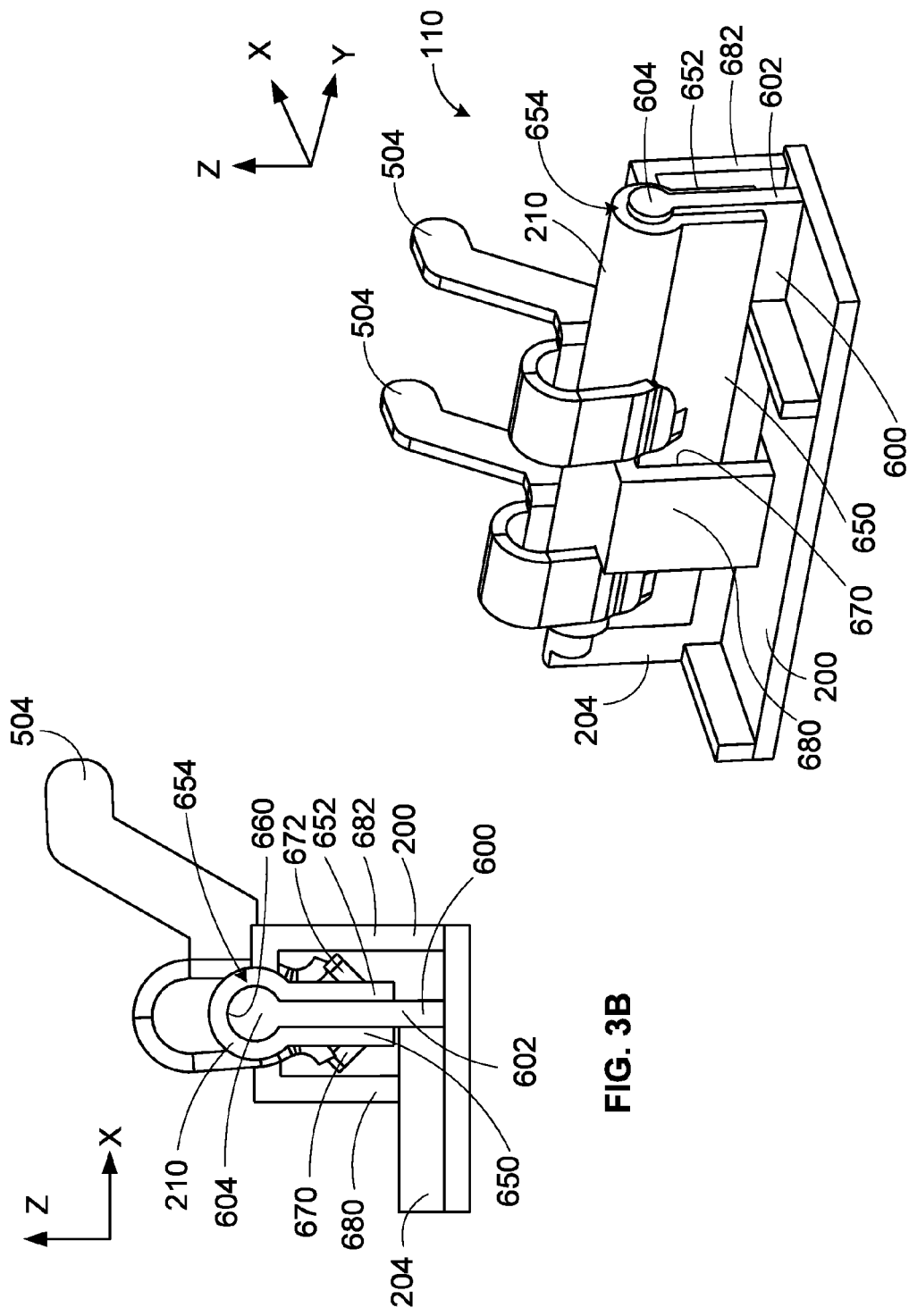

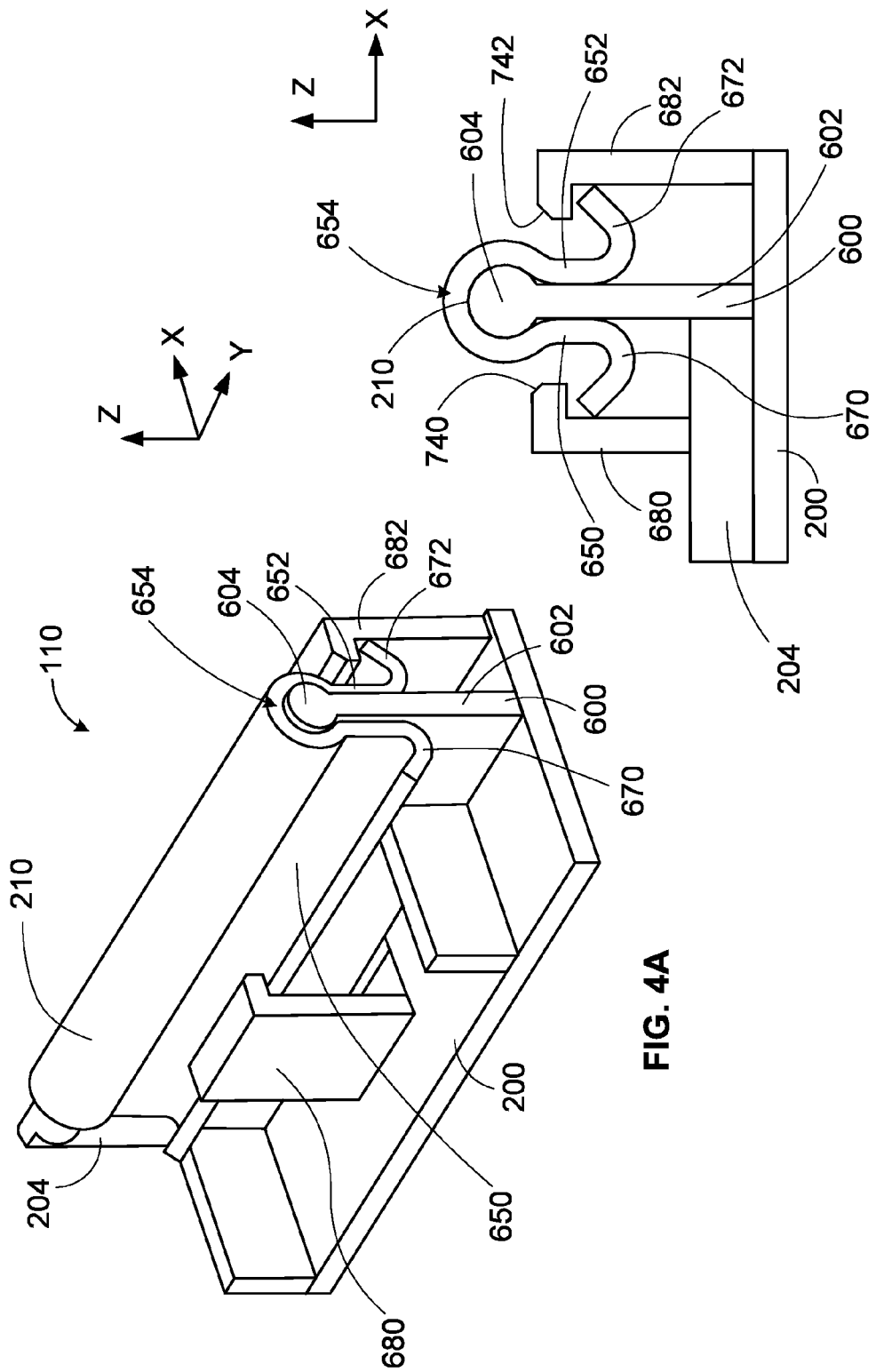

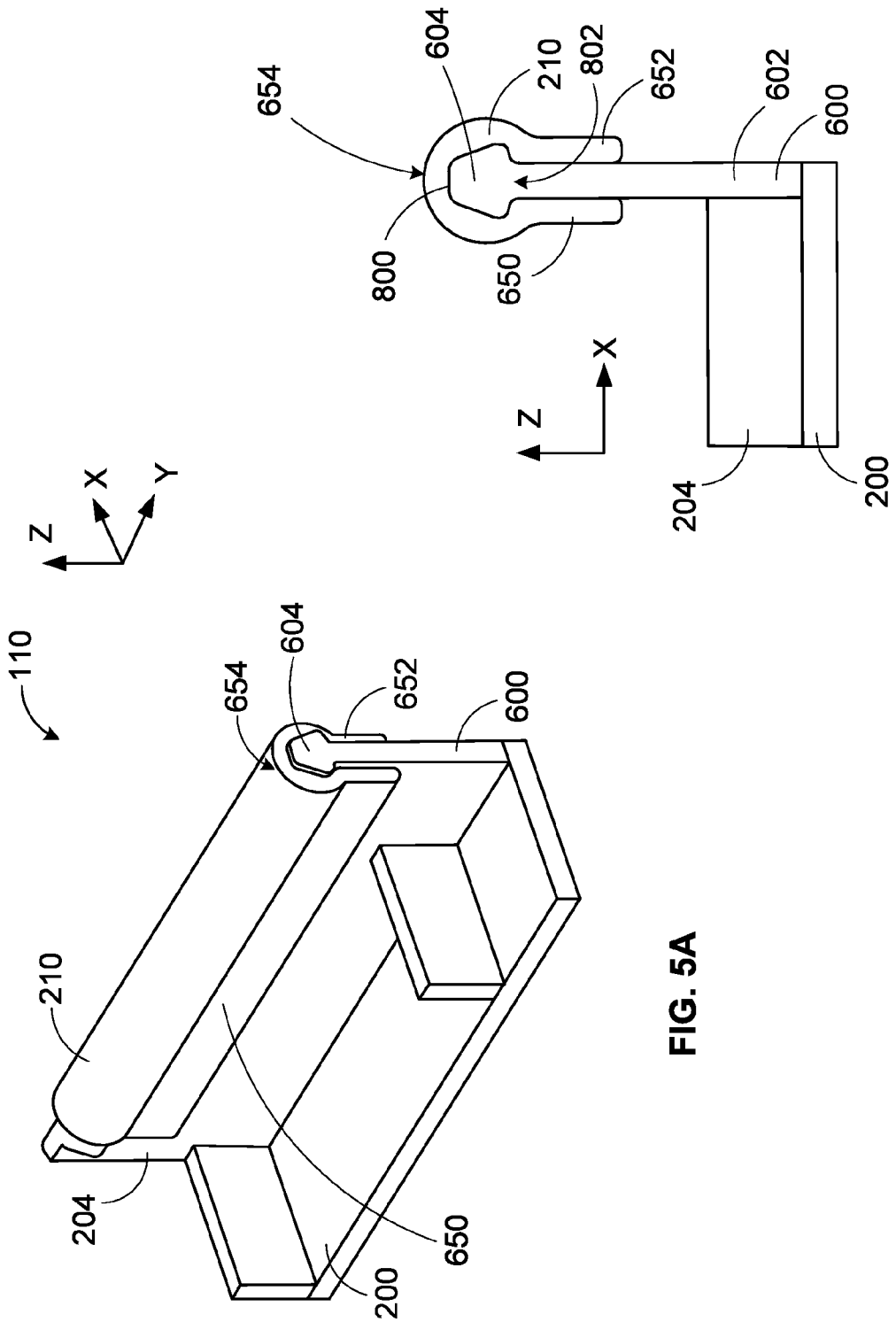

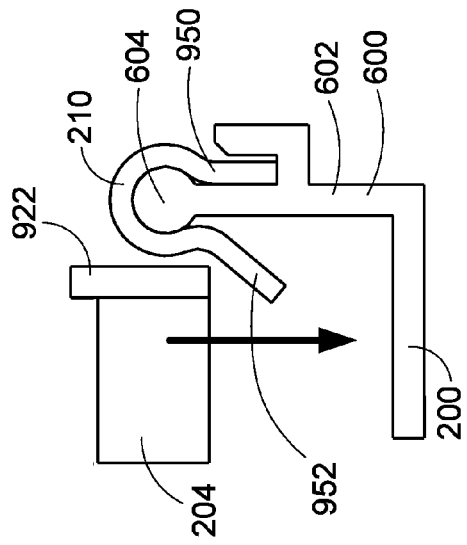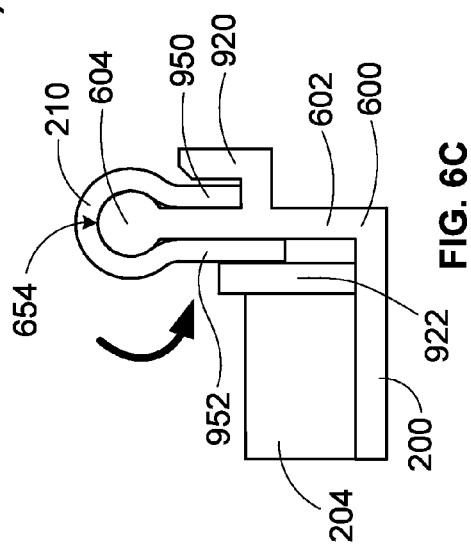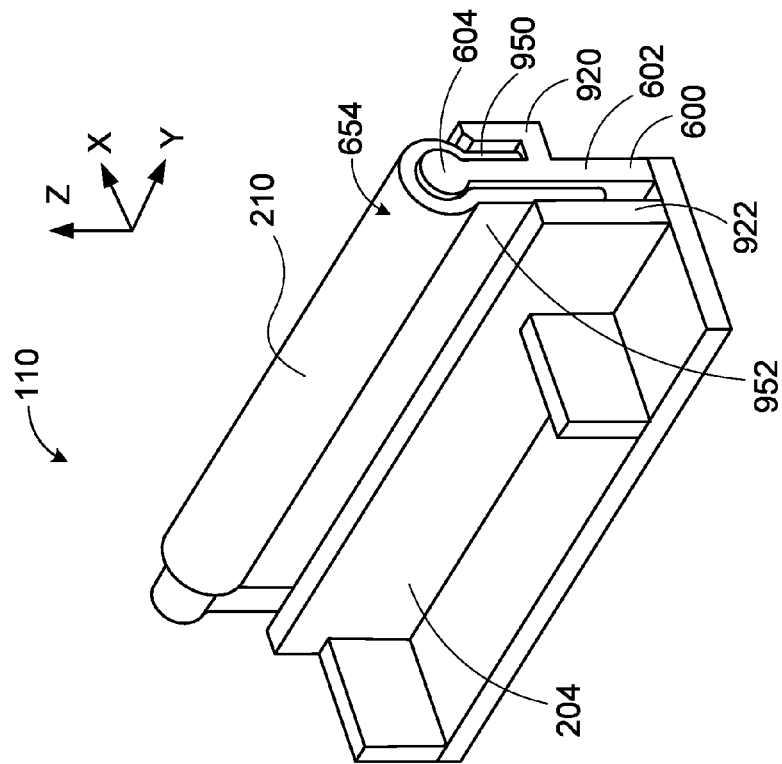

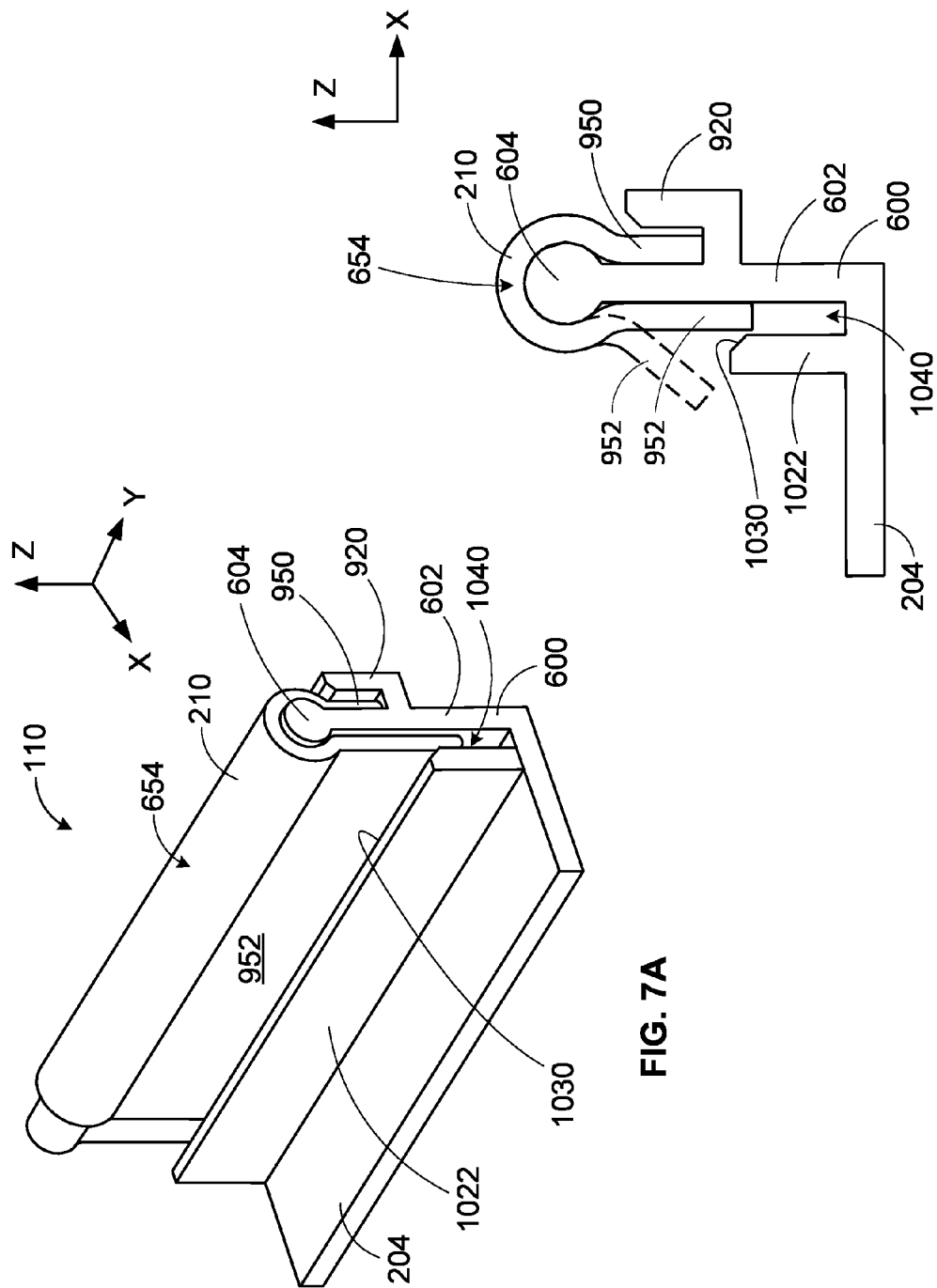

SNAP-IN AND SNAP-ON NEUTRAL RAIL ASSEMBLIES IN A PLUG-ON NEUTRAL LOAD CENTER

FIELD OF THE INVENTION

Aspects of the present disclosure relate to electrical distribution equipment and methods of assembling the same, and in particular, to a plug-on neutral load center featuring a neutral rail that is installed in a Z-axis direction by snapping into or snapping onto a dielectric substrate and methods of assembling the same into a plug-on neutral load center.

BACKGROUND

A load center is housed within a metal enclosure or panel and holds multiple circuit breakers that are connected to various branch circuits in an electrical distribution system. Some load centers feature a plug-on neutral rail or rail to which neutral connectors or jaws of the circuit breakers plug onto. These plug-on type circuit breakers have the convenience of being able to plug directly onto the neutral rail without using any fasteners or wiring to connect the circuit breaker to the neutral busbar in the load center. Assembling the dielectric and conductive pieces of the load center before installing it into the enclosure is a time-consuming, labor-intensive process. A need exists for reducing and simplifying the assembly of the load center using fewer components and fewer steps.

BRIEF SUMMARY

Aspects of the present disclosure relate to a plug-on neutral rail assemblies in which the neutral rail is snapped onto a fixed substrate without the use of additional fasteners. "Plug-on" in this context refers to the type of neutral jaw or connector in the circuit breakers that are attached to the neutral rail. These neutral jaws simply plug onto the neutral rail without any fasteners, and the circuit breaker is simply rotated onto the neutral rail until the neutral jaws grab and engage the neutral rail to make the mechanical and electrical connection between the neutral busbar of the load center and the neutral side of the circuit breaker. The assemblies described herein can be referred to as featuring "snap-on" neutral rails in which the neutral rail snaps onto a support member on the dielectric barrier without any fasteners. The dielectric barrier can include two pieces—a dielectric base that maintains an airgap separation between the downwardly extending neutral conductors and the grounded metal wall of the enclosure, and a shield member that creates a dielectric insulation between the energized phase conductors carrying line or phase current to electrical stabs in the load center and the neutral rail and grounded metal enclosure. The support and retention features in the snap-in and snap-on embodiments can be formed in the base or the shield member or a combination of both.

In a first aspect, the neutral rail has a pair of legs with lanced out features that snap fit under retention features of the base. The neutral rail has a keyhole shape where the round portion fits over a cylindrically shaped support. The lanced out features are snap fit into engagement as the neutral rail is lowered (along the Z-axis) onto the support until the lanced out features are retained under the retention features provided with the base.

In a second aspect, the neutral rail has a pair of legs whose ends are bent away from one another and retained beneath retention features of a base. A keyhole-shaped support prevents the neutral rail from being lifted away as neutral connectors of circuit breakers are unplugged from the neutral rail.

In a third aspect, the support member of the base resembles a blunted or flattened arrowhead, and the neutral rail has a conformal shape with a pair of extending legs that straddle the support and secure the neutral rail onto the support without the need for any fasteners. Here, no lanced out features or flared out leg ends are needed on the neutral rail. The trapezoidal geometry of the cross section of the support is sufficient to retain the neutral rail thereon as plug-on neutral connectors are unplugged from the neutral rail.

In a fourth aspect, a neutral rail with a pair of legs, one shorter than the other, is installed over a support of a base. The support holds the shorter leg in a retention feature, and the longer leg, which is initially bent outwards away from the support when the neutral rail is installed onto the support, is bent inwards into parallel orientation with the shorter leg by a corresponding retention feature of a shield member that is installed along the Z-axis direction after the neutral rail has been positioned on the support. The installation of the shield member causes the longer leg to bend inwards to the support.

In an fifth aspect, the dielectric barrier includes two retention features that retain both the shorter leg and the longer leg of the neutral rail on the same substrate. The retention feature for the longer leg features an angled surface to facilitate the rotation of the longer leg into position against the Z-axis support of the dielectric substrate.

According to a sixth aspect, the neutral rail is held in place by multiple spring clips that are retained by snap fit connection between clip retention features formed in the dielectric barrier. The neutral rail is installed over a support (along the Z-axis) of the dielectric barrier, and then the spring clips are snapped fit into place over corresponding grooves or notches formed along the neutral rail until the spring clips are retained by the clip retention features of the dielectric barrier.

According to a seventh aspect, the dielectric barrier has multiple posts that protrude away along the Z-axis, and the neutral rail has corresponding countersunk through-holes through which the posts pass through. The neutral rail is positioned over the posts until the holes line up, and the neutral rail is lowered along the Z-axis over the posts until the exposed tops of the posts protrude through the tops of the through-holes in the neutral rail. The exposed posts are heat staked to affix the neutral rail onto the dielectric barrier.

According to an eighth aspect, the dielectric barrier features a shield member with straps that fit over the neutral rail. The base of the dielectric barrier is provided with supports on which the neutral rail rests when installed thereon along the Z-axis. Then, the straps of the shield member are positioned over the neutral rail as the shield member is lowered along the Z-axis direction onto the neutral rail until the straps engage the neutral rail along its length to hold the neutral rail in secure engagement between the base and shield member of the dielectric barrier.

The aspects described herein advantageously feature a Z-axis construction assembly method in which one or both dielectric barrier components (e.g., the base and the shield member) and the neutral rail component are installed into a plug-on load center along the same direction and the same Z-axis without any fasteners and without having to reposition or reorient any previously installed components prior to installing the next component into the load center.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIGS. 3A and 3B are perspective and cross-sectional views of a snap-on configuration in which the neutral rail is snapped onto a support member of a base and includes lanced-out features that snap fit under hooks of the base according to yet another aspect of the present disclosure;

FIGS. 4A and 4B are perspective and cross-sectional views of a snap-on neutral rail that features a pair of legs with flared out ends that snap fit under hooks of the base according to a still further aspect of the present disclosure;

FIGS. 5A and 5B are perspective and cross-sectional views of a snap-on neutral rail having a pair of legs and which snap fits onto a support having a flattened arrow shape according to another aspect of the present disclosure;

FIGS. 6A-6C illustrate perspective and cross-sectional views of a snap-on neutral rail having a pair of legs, one shorter than the other and initially bent away from one another, in which the longer leg is bent into parallel arrangement with the shorter leg by the installation along the Z-axis of a shield member onto the base according to yet a further aspect of the present disclosure;

FIGS. 7A and 7B illustrate perspective and cross-sectional views of a snap-on neutral rail like the one shown in FIGS. 6A-6C except that the legs are retained by leg retention features formed in the dielectric barrier according to a further aspect of the present disclosure;

Figure 1:
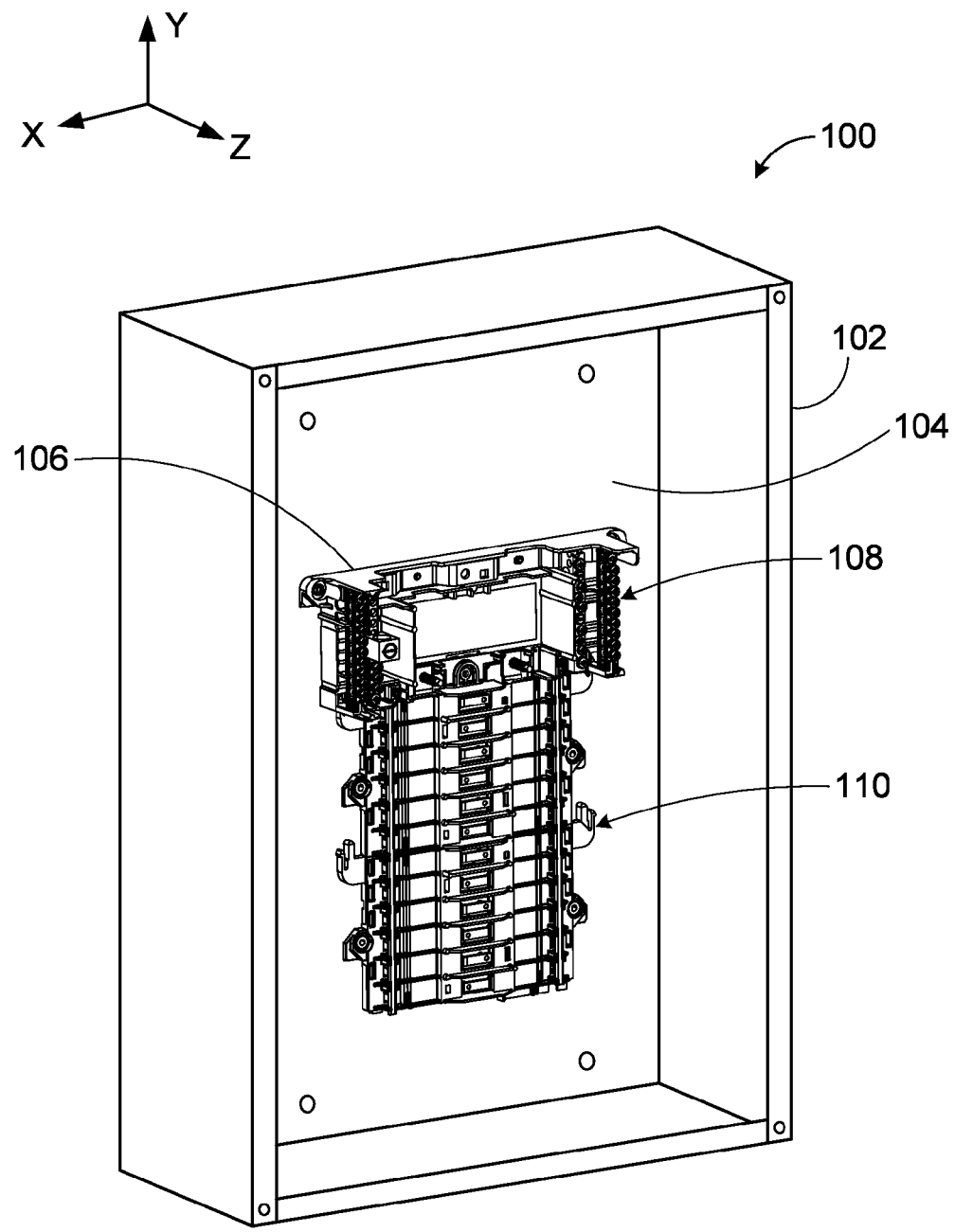
FIG. 1 is a perspective view of an enclosure housing a load center with the door or access panel removed.

While aspects of the present disclosure are susceptible to various modifications and alternative forms, specific embodiments or implementations have been shown by way of example in the drawings and will be described in detail herein. It should be understood, however, that this disclosure is not intended to be limited to the particular forms disclosed. Rather, this disclosure is to cover all modifications, equivalents, and alternatives falling within the spirit and scope of the invention as defined by the appended claims.

DETAILED DESCRIPTION

Referring to FIG. 1, a perspective view of an enclosure 102 of an electrical distribution apparatus 100, such as a panelboard or load center 106, is shown with the door or cover removed so that the lug and mounting connections of the load center 106 to plug-on neutral type circuit breakers can be seen. The load center 106 includes a main section 108 and a plug-on section 110. In general, like reference numbers refer to like structures throughout the figures and various embodiments, and a reference number starts with the number of the figure where the reference number is first introduced. The enclosure 102 is metal and has a rear wall 104 opposite the panel or door (not shown) to which the main section 108 and the plug-on section 110 is mounted. All of the implementations and embodiments described feature components that are used in the load center 106. The enclosure 102 is not shown in the subsequent figures, but it is understood that the load center 106 is installed into the enclosure 102 of the electrical distribution apparatus 100 as shown in FIG. 1.

The focus of this disclosure is on the plug-on section 110, which features a plug-on type neutral rail 210 (FIG. 2) as described in more detail below. The neutral rail 210 is an electrical conductor that is made of an electrically conducting material such as aluminum or copper. Circuit breakers, of which there can be, for example, 24 or 30 or 60 per enclosure 102, such as a circuit breaker 500 (FIG. 10A), featuring a plug-on neutral connector 504 (FIG. 3A) can be mounted to the neutral rail 210 in the plug-on section 110 by plugging the connector 504 onto the neutral rail 210 without requiring any other fasteners to secure the neutral connection of the circuit breaker 500 to the load center 106. The neutral connector 504 of the circuit breaker 500 connects the circuit breaker 500 to neutral current distributed by the electrical distribution apparatus 100. The circuit breaker 500 also has a conventional line or phase connector or jaw 508, which connects to a line or phase current also distributed by the electrical distribution apparatus 100, which is connected between a source (e.g., one or more phases) of electrical current and one or more loads in one or more electrical circuits protected by the circuit breakers 500 installed in the electrical distribution apparatus 100. An example of a suitable circuit breaker 500 is any electronic neutral plug-on type circuit breaker from the SQUARE D® brand QO® or HOM® line of circuit breakers available from Schneider Electric. Of course, any other circuit breaker having a plug-on neutral connector can be used as the circuit breaker 500, and can be from the same or different manufacturers as other circuit breakers installed on the load center 106. For convenience, although the form factor of the neutral rail 210 is different in the various embodiments shown in the illustrations, for convenience, the reference number 210 shall be used herein to refer to the neutral rail, regardless of its form factor. Features of the neutral rail vary from embodiment to embodiment, and these features are labeled with unique reference numbers. Although the cross section, shape, or form factor of the neutral rail 210 can vary, in all embodiments, the neutral rail 210 is composed of an electrically conductive material, such as aluminum or copper, it is configured to receive corresponding plug-on neutral connectors of one or more plug-on type circuit breakers, like the circuit breaker 500, and they are elongate structures that extend in a direction along the Y-axis as shown in FIG. 1.

Figure 2:
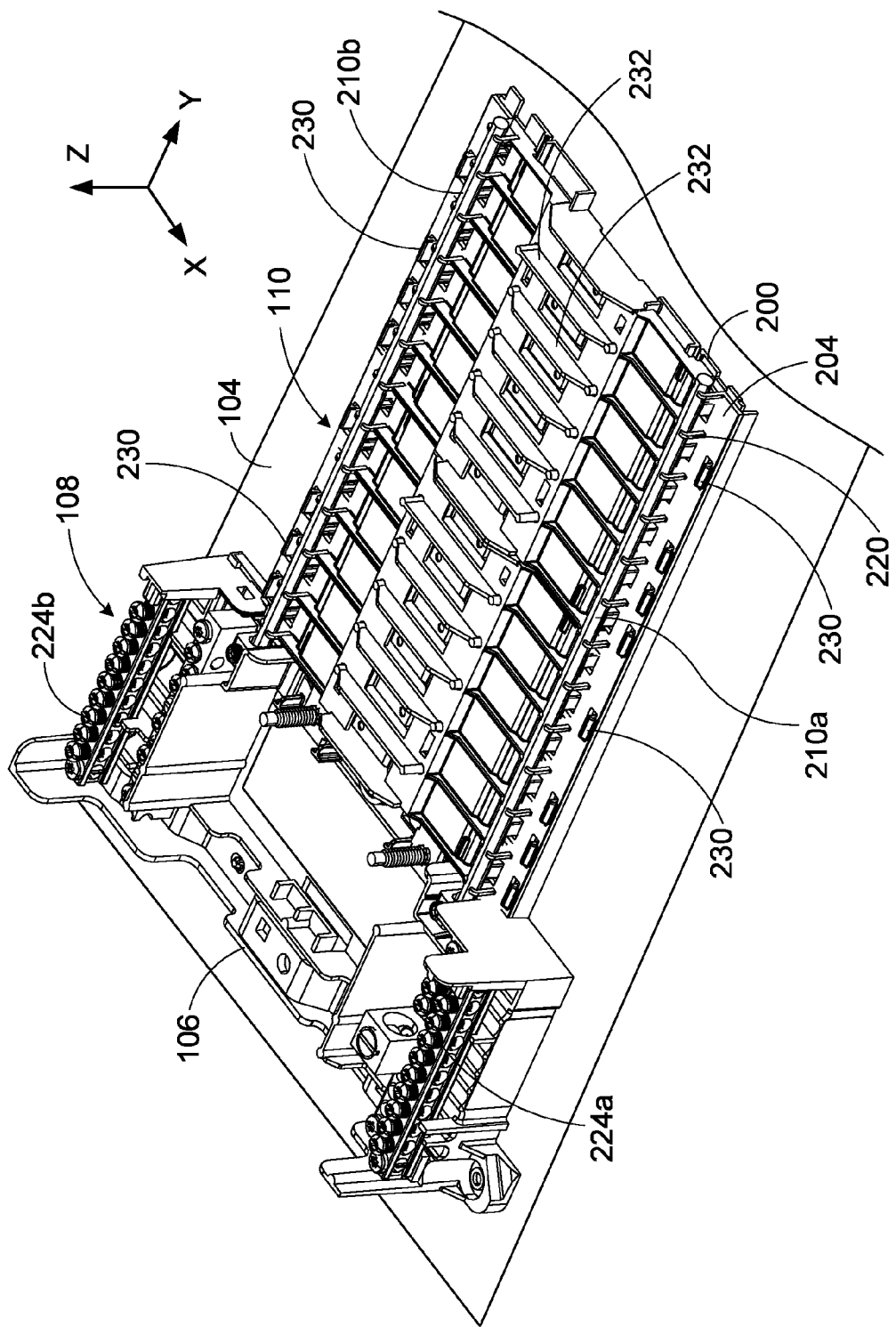
FIG. 2 is a top perspective view of the load center showing two neutral rails installed and securely retained between a dielectric shield member and a dielectric base in snap-in or snap-on configurations according to various aspects of the present disclosure.

The plug-on section 110 of the load center 106 optionally includes fixed dielectric base or substrate 200 (FIG. 2) having a major surface that defines an X-Y (Cartesian coordinates) plane as shown in FIG. 2. The Z-axis is orthogonal to the X-Y plane. The substrate or base 200 is fixed relative to the rear wall 104 of the enclosure 102. The plug-on section 110 also includes a dielectric shield member 204 (FIG. 2) that is separate from the fixed dielectric base 200. The dielectric shield member 204 and the base 200 together form a two-piece dielectric (insulating) barrier between the neutral rail 210 and phase conductors carrying line or phase current to the load center 106. The phase conductors (hidden in FIG. 2 because they are sandwiched between the base 200 and the shield 204) are connected to conductive stabs 232, shown in FIG. 2, to which a conventional line jaw (not shown) of the circuit breaker 500 are connected. The dielectric shield member 204 can include one or more retention features as described more fully below, and these one or more retention features are positioned when installed against the base 200 a distance away from the X-Y plane along the Z-axis and from the rear wall 104. A retention "feature" is a structural feature that retains another structure (e.g., the neutral rail 210) in a fixed position or in a secure engagement relative to one another. The plug-on neutral rail 210 in all embodiments has an elongate (lengthwise) shape, such as a rail, having a cross section that can take different forms or shapes as described in the various embodiments below. For example, the surface portion of the neutral rail 210 that accepts or receives the plug-on connector 504 of the circuit breaker 500 can have a width of 0.25 inches so that the neutral rail 210 is compatible with conventional plug-on neutral connectors, such as the connectors 504. Further, the rail 210 can have a length of 9.5 inches to accommodate up to twelve neutral plug-on type circuit breakers or 23 inches to accommodate up to thirty neutral plug-on type circuit breakers.

The base 200 can operate to maintain a through-air gap spacing, such as 0.5 inches, between the neutral rail 210 and the grounded rear wall 104 of the enclosure 102. This ensures that the neutral connectors 504 of the circuit breakers 500 installed on the neutral rail 210 when energized do not produce an arc or ground fault relative to the grounded rear wall 104. The shield member 204 operates to maintain a dielectric separation between the phase conductors and the neutral rail 210. The phase conductors are sandwiched between the base 200 and the shield member 204, creating a dielectric separation relative to both the grounded enclosure 100 and the energized phase conductors and neutral rails 210a,b. Like the neutral rail 210, for the sake of convenience, the base 200 and the shield member 204 will retain their reference numbers throughout the illustrations, even though their shape or form factor may differ from embodiment to embodiment. Generally speaking, the base 200 maintains an air gap separation between the neutral connectors 504 of the circuit breaker(s) 500 installed onto the neutral rail 210, as well as creates a dielectric barrier between the energized phase conductors and the grounded enclosure 102. Generally speaking, the shield member 204 operates in conjunction with the base 200 or independent of the base 200 to create a dielectric barrier between the energized phase conductors and the grounded enclosure 102, and more importantly, includes one or more retention features that secure the neutral rail 210 within the load center 106, preferably without any fasteners and preferably using Z-axis installation methods. The base 200 and the shield member 204 can be snap-fit together by snap-fit connectors 230.

The main section 108 includes neutral busbars 224a, 224b, which are physically and electrically connected to the neutral rails 210. The neutral busbars 224a, 224b conventionally connect the load center 106 to a neutral electrical current returned to a power source external to the enclosure 102.

The assemblies shown and described herein will be referred to herein for convenience as corresponding to a "snap-on" plug-on neutral rail. By "snap-on," it is meant that the neutral rail 210 snaps onto a support member to secure the neutral rail 210 into the load center 106, again preferably without any fasteners, though the use of fasteners is not precluded. FIGS. 8, 9, and 10A-C illustrate other embodiments of installing a neutral rail 210 into a load center 106 along the Z-axis and without requiring the use of any fasteners to secure the neutral rail 210 therein.

As noted above, the rear wall 104 defines a plane that lies along the X-Y axes shown in FIG. 2. The dielectric substrate (or base) 200 has a major surface that is parallel with the plane. The neutral rail 210 is snapped onto a support member and retained thereon securely preferably without any fasteners and installed thereon along the Z-axis direction. Features common to all embodiments will be described first, and then features specific to each embodiment will be described with reference to the respective figures. These common features will be provided with common reference numbers used throughout FIGS. 3A-3B, 4A-4B, 5A-5B, 6A-6C, and 7A-7B for the sake of convenience, even though they are used on different embodiments.

FIG. 3A is a perspective illustration of part of a plug-on section 110 like the one shown in FIG. 1, which includes a support 600 that extends away from the X-Y plane along the Z-axis. The support 600 includes a lower portion 602 and an upper portion 604 that is wider than the lower portion 602. In the illustration shown in FIG. 3A, the neutral rail 210 and the support 600 approximate a keyhole form factor, in which the upper portion 604 has a cylindrical section that transitions to the rectangular lower portion 602. The neutral rail 210 has two legs 650, 652 that extend along the lower portion 602 of the support 600 and a plug-on portion 654 that extends around the upper portion 604 of the support 600. In this example, the support 600 is integral with the shield member 204, though in other aspects, the support 600 can be part of the base 200 or a separate piece from both the base 200 and the shield member 204.

The neutral rail 210 is snap-fit over the cylindrical upper portion 604 of the support 600 in a direction along the Z-axis such that the two legs 650, 652 straddle the lower portion 602 of the support 600, and such that the plug-on portion 654 of the neutral rail 210 engages the upper portion 604. The neutral rail 210 includes an angled feature 670, 672 (see FIG. 6B) that is angled away from one of the two legs 650, 652 and away from the lower portion 602 of the support 600 toward (on the Z-axis) the upper portion 604. A first snap fit hook 680 in the example shown is part of the base 200, and the first lanced out feature 670 is snap fit to the first snap fit hook 680 when the neutral rail 210 is installed onto the upper portion 604 in the direction along the Z-axis. As described above, the upper portion 604 of the support 600 can have a cylindrical feature extending along a length (Y-axis) of the support 600 such that the support 600 resembles an approximate keyhole shape. The plug-on portion 654 of the neutral rail 210 has a rounded inner surface 660 (FIG. 3B) to engage the cylindrical feature or upper portion 604 of the support 600 in response to the neutral rail 210 being installed on the upper portion 604. The plug-on section 110 also includes a second snap fit hook 682 (FIG. 3B) opposing the snap fit hook 680 such that the angled features 670, 672 of the legs 650, 652 of the neutral rail 210 become trapped under the first and second snap fit hooks 680, 682, respectively, in response to the rounded top portion 654 being snap fit onto the cylindrical feature or upper portion 604 of the support 600. Neutral connectors 504 of circuit breakers 500 are shown disembodied from the circuit breakers for ease of illustration, i.e., the circuit breakers 500 have been removed to show how two neutral connectors 504 from two adjacent circuit breakers 500 are installed onto the rail 210 as shown in FIG. 3A. The snap fit hooks 680, 682 are positioned on the base 200 so that they do not interfere with the snap-fit connection of the neutral connectors 504 onto the rail 210.

FIGS. 4A and 4B illustrate a slightly different configuration from that shown in FIGS. 3A-3B in that the ends of the legs 650, 652 of the neutral rail 210 are bent away from each other to become trapped beneath first and second snap fit hooks 680, 682 as shown in FIG. 4B. FIG. 4A is a perspective illustration of part of a plug-on section 110 like the one shown in FIG. 1, which includes a support 600 that extends away from the X-Y plane along the Z-axis Like the support shown in FIGS. 3A-3B, the support 600 shown in FIGS. 4A-4B includes a lower portion 602 and an upper portion 604 that is wider than the lower portion 602. In the illustration shown in FIG. 4A, the support 600 approximates a keyhole shape, in which the upper portion 604 has a cylindrically shaped section that transitions to a rectangular-shaped lower portion 602. The same reference numbers in FIGS. 4A-4B refer to the same elements shown and described in connection with FIGS. 3A-3B, and for ease of discussion will not be repeated here. Instead, differences between the two configurations will be described next.

Instead of lanced-out features 670, 672 shown in FIGS. 3A-3B, each of the legs 650, 652 of the neutral rail 210 shown in FIGS. 4A-4B has respective angled ends 670, 672 that are bent away (e.g., along the X-axis) from the lower portion 602 and toward (along the Z-axis) the upper portion 604 of the support 600. A second snap fit hook 682 opposing the first snap fit hook 680 provides a snap fit connection to the angled end 672 of the neutral rail 210. The snap fit hooks 680, 682 also include respective angled surfaces 740, 742 that are angled downward (along the Z-axis) toward the lower portion 602 and away from the upper portion 604 as shown in FIG. 4B. The angled surfaces 740, 742 allow the angled ends 670, 672 of the neutral rail 210 to slightly retract toward the legs 650, 652 as they are pushed downward (Z-axis) onto the support 600 to create a snap fit connection such that the angled ends 670, 672 of the legs 650, 652 of the neutral rail 210 become trapped under the first and second snap fit hooks 680, 682, respectively.

The configurations shown in FIGS. 3A-3B and 4A-4B allow sufficient clearance for the downwardly (Z-axis) extending neutral connectors 504 of the circuit breaker 500. The snap fit hooks 680, 682 can be positioned between circuit breakers in areas where the neutral connectors 504 will not be received on the neutral rail 210.

FIGS. 5A-5B show another configuration of a neutral rail 210 without the angled features 670, 672 shown in FIGS. 3A-4B. Again, like reference numbers refer to like parts in FIGS. 5A-5B and will not be described again here. Instead, the plug-on portion 654 of the neutral rail 210 has a generally trapezoidal cross section in which a shorter base of the trapezoid 800 is distal from the legs 650, 652, and a longer base 802 of the trapezoid is proximal to the legs 650, 652. Likewise, the upper portion 604 of the support 600 also has a generally trapezoidal cross section having dimensions to permit the plug-on portion 654 to be snap-fit onto the upper portion 604 and retained thereon by the respective geometries of the trapezoidal cross sections. The trapezoidal or irregular cross section provides a snug, secure fit for the neutral rail 210 onto the support 600. In this example, the support 600 resembles a blunted arrow in which the tip of the arrow has been blunted or flattened. As the neutral connectors 504 of circuit breakers 500 installed onto the plug-on section 110 are removed from the neutral rail 210, they will tend to force the neutral rail 210 away from the support 600. An irregular cross section, like the one shown in FIGS. 5A-5B prevent the neutral rail 210 from staying with the neutral connector 504 when the circuit breaker 500 is unplugged from plug-on section 110. Here, because there are no corresponding snap fit hooks 680, 682, there is sufficient clearance below the plug-on portion 654 to receive the downwardly extending neutral connectors 504 of the circuit breakers 500 installed on the plug-on section 110.

The next two configurations shown in FIGS. 6A-7B show a neutral rail 210 having two legs 950, 952 in which one of the legs is shorter than the other. The first leg 950 of the neutral rail 210 is shorter than the second leg 952. The support 600 including a first leg retention feature 920 into which the first leg 950 is received. A second leg retention feature 922, which can be part of the shield member 204 as shown in FIG. 6A or part of the base as shown in FIG. 7A, is configured to hold the second leg 952 against the lower portion 602 of the support 600 after the neutral rail 210 is snap fit onto the upper portion 604 of the support 600. The upper portion 604 is cylindrically shaped like the arrangements shown in FIGS. 3A-4B. As shown in FIG. 6B, the second leg 952 of the neutral rail 210 is originally bent away (X-axis) from the first leg 950 in a non-parallel manner, and the neutral rail 210 is snap-fit installed onto the top portion 604. As indicated by the arrow, the shield member 204 is then installed in a downward direction along the Z-axis, and as the shield member 204 is installed onto the base 200, the second leg retention feature 922 urges the bent second leg 952 (as shown by the arrow in FIG. 6C) into a parallel position relative to the first leg 950 until the second leg 952 abuts the lower portion 602 of the support 600.

In FIGS. 7A-7B, a second leg retention feature 1022 is part of the shield member 204 (or the base 200). The second leg retention feature 1022 is spaced apart from the lower portion 602 of the support 600 and parallel to the support 600. The second leg retention feature 1022 includes an angled surface 1030 at a leg-engaging end (where the lead line for reference number 1030 ends). The angled surface 1030 is angled toward (X-axis) the lower portion 602 to permit the second leg 952 of the neutral rail 210 to be bent into snap fit engagement past the angled surface 1030 and into a space 1040 between the second leg retention feature 1022 and the lower portion 602 of the support 600. To assemble this plug-on section 110 of FIGS. 7A-7B, the base 200 or the shield 204, which includes the second leg retention feature 1022, is installed onto the rear wall 104 along a Z-axis direction. The neutral rail 210 with an outwardly bent second leg 952 is installed onto the support 600 also in the same Z-axis direction. Finally, the outwardly bent second leg 952 of the neutral rail 210 is pressed toward the support 210 past the angled surface 1030 into snap fit engagement with the second leg retention feature 1022.

Figure 8:
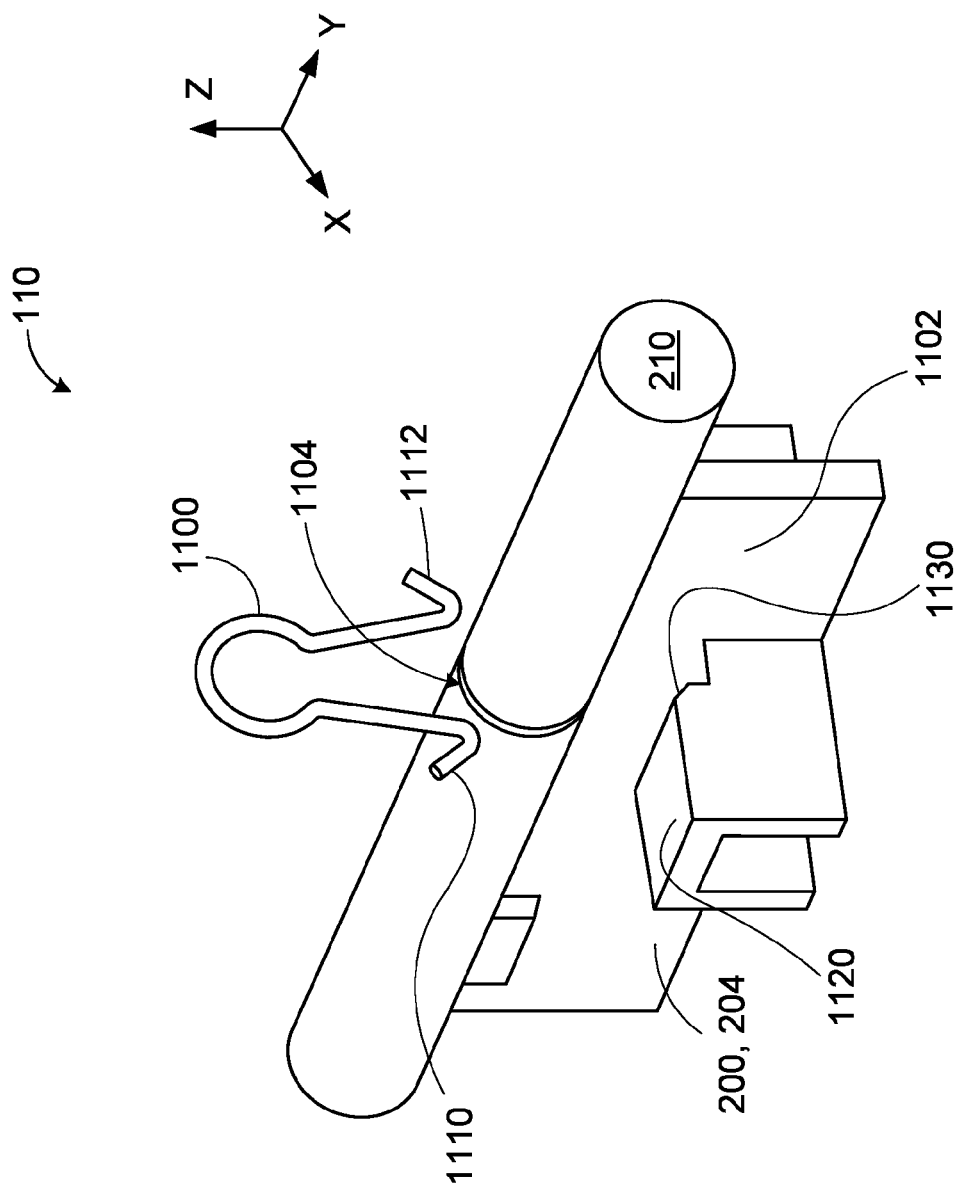
FIG. 8 is a perspective view of a neutral rail that is held onto a support of a dielectric barrier by spring clips, which are themselves snap fit under hook retaining features of the dielectric barrier according to still another aspect of the present disclosure.

FIG. 8 illustrates part of a different embodiment of a plug-on section 110 shown in FIG. 1 and uses a spring clip 1100 to secure the neutral rail 210 onto a support 1102, which can be part of the base 200 or the shield member 204. The neutral rail 210 has a notch 1104 formed along its surface (parallel to a cross section of the neutral rail 210) to receive the spring clip 1100. The spring clip 1100 includes a pair of opposing hook ends 1110, 1112 that are bent upwards (Z-axis) away from the support 1102 and away from each other as shown in FIG. 8. The hook end 1110 is received under a hook retaining feature 1120, which includes an angled surface 1130 that is angled toward the support 1102 and away from the neutral rail 210 to facilitate the receipt of the hook end 1110 under the hook retaining feature 1120. The other hook end 1112 is also received under a corresponding hook retaining feature (hidden from the perspective angle shown in FIG. 8) that is like the hook retaining feature 1120 that is visible in FIG. 8. Multiple spring clips 1100, notches 1104, and sets of hook retaining features 1120 can be spaced along the length (Z-axis) of the neutral rail 210 to secure the neutral rail 210 by snap fit connection to the support 1102 without the need for any fasteners.

Figure 9:
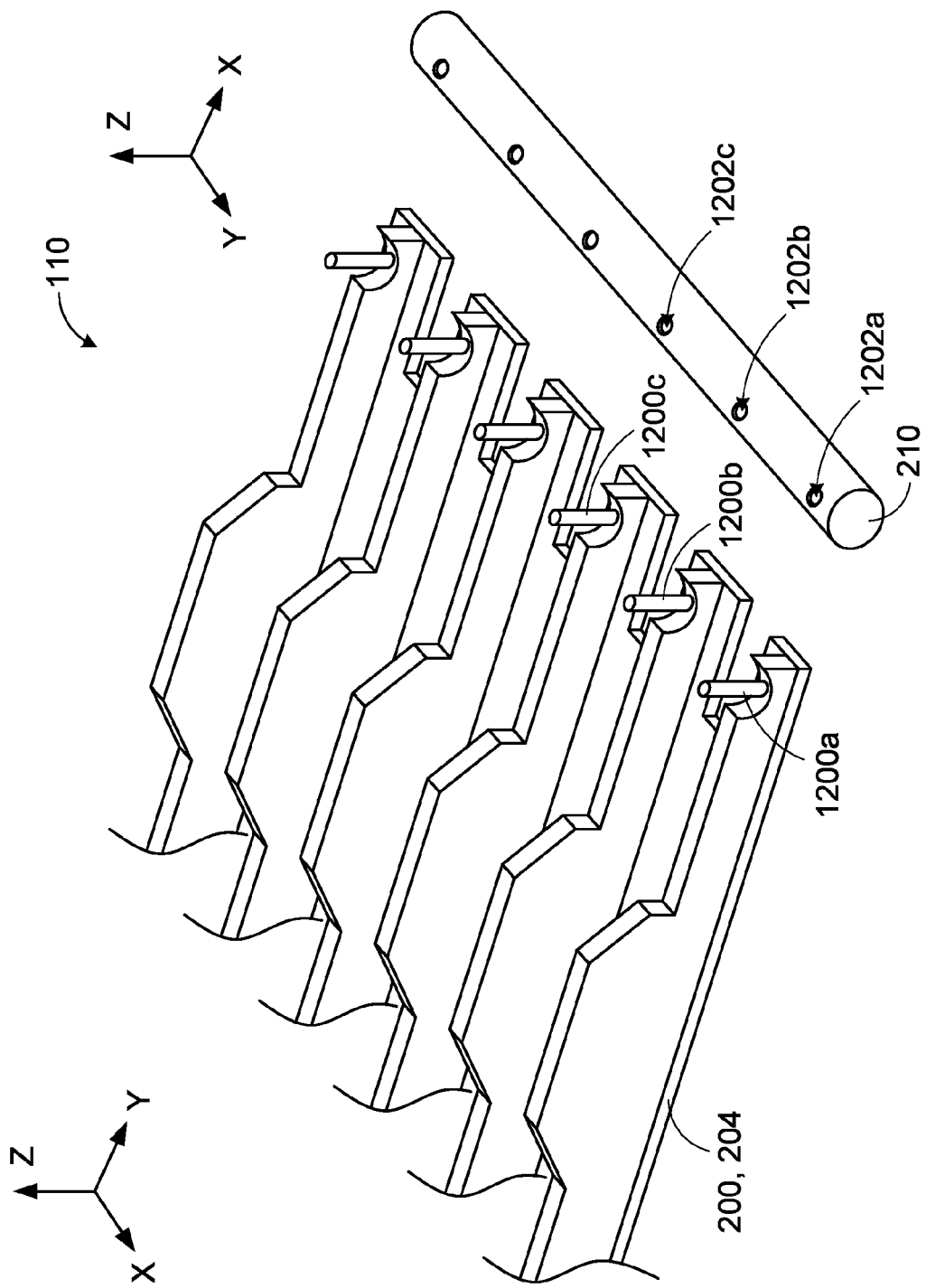
FIG. 9 is a perspective view of a dielectric barrier featuring posts onto which a neutral rail featuring through-holes is installed, and the protruding ends of the posts are heat-staked to secure the neutral rail to the dielectric barrier according to yet another aspect of the present disclosure.

FIG. 9 illustrates a fastener-less way of securing a neutral rail 210 to a dielectric substrate, such as the base 200 or the shield member 204 shown in FIG. 1. The dielectric substrate 200, 204 includes posts 1200a, 1200b, 1200c (only three are labeled, but the substrate 200, 204 includes many of such posts), generally designated as 1200, that protrude away from the substrate 200, 204 along the Z-axis. The neutral rail 210 includes through-holes 1202a, 1202b, 1202c (again, only three are labeled for ease of illustration) formed by a countersink drill such that the holes are conical shaped as shown in FIG. 9. The holes, generally designated as 1202, pass through the diameter of the neutral rail 210. The neutral rail 210 is installed onto the substrate 200, 204 by aligning the through-holes 1202 with their corresponding posts 1200, and then the neutral rail is dropped downwards (along the Z-axis) onto the substrate 200, 204, until the tips of the posts 1200 protrude through the tops of the through-holes 1202. These exposed tips are then heat-staked to secure the neutral rail 210 to the substrate 200, 204.

Figure 10A:
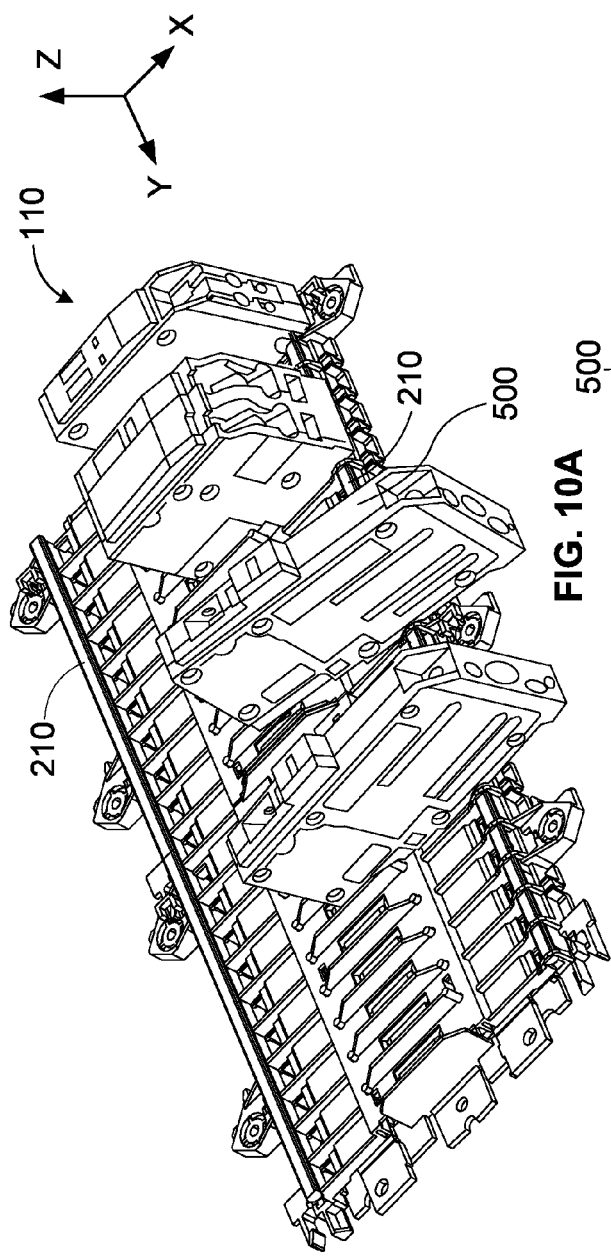
FIGS. 10A-10C are perspective and cross-sectional views of a dielectric barrier featuring straps that secure the neutral rail between a shield member and base within the load center according to another aspect of the present disclosure.
Figure 10C:
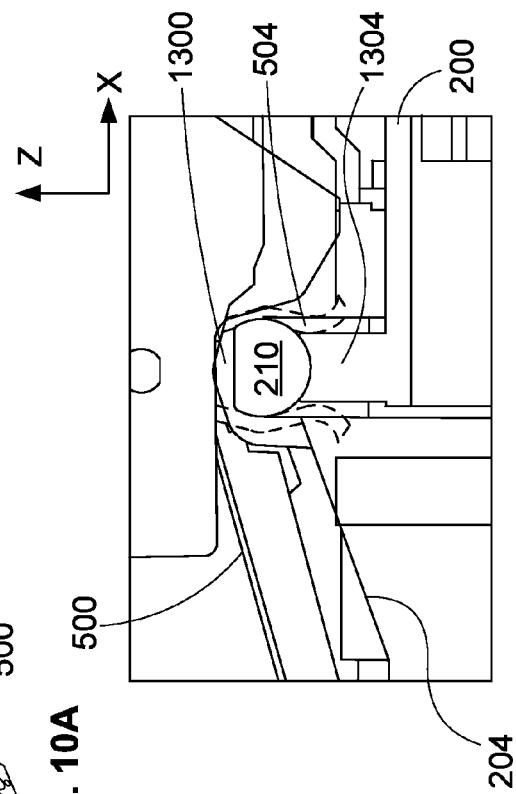
Figure 10B:
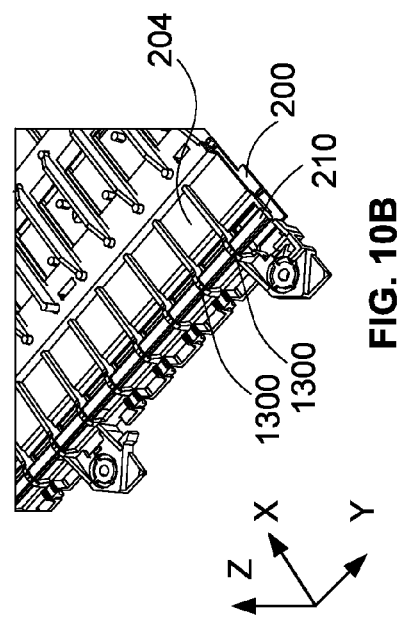

FIGS. 10A-10C illustrate a plug-on section 110 having neutral rails 210 that are retained between two dielectric substrates, such as the base 200 and the shield member 204 described above, by straps, generally designated by reference number 1300. These straps 1300 are arranged along (Y-axis) the length of the shield member 204 at a spacing such that the exposed areas of the neutral rails 210 can receive neutral connectors 504 of circuit breakers 500 that are plugged onto the neutral rails 210. To assemble this plug-on section 110 shown in FIGS. 10A-10C, the neutral rail 210, which resembles an elongate rod having a round or circular cross section, is installed along the Z-axis onto supports 1304 (FIG. 10C) that have corresponding concave surfaces to receive the round neutral rail 210 thereon. Finally, the shield member 204 is installed along the Z-axis over the neutral rails 210 and onto the base 200 such that the straps 1300 retain the neutral rails 210 in a secure engagement onto the supports 1304 between the base 200 and the shield member 204. All parts 200, 210, 204 are installed in the same direction along the Z-axis without any fasteners or repositioning or reorienting any of the previously laid-down parts. The base 200 and the shield member 204 can be snap fit together without any fasteners.

Words of degree, such as "about," "substantially," and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the inventive aspects disclosed herein.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. An electrical distribution apparatus, comprising:
a dielectric shield member having a major surface defining a plane;
a support that extends away from the plane along a z-axis, the support including a lower portion and an upper portion that is wider than the lower portion; and
a plug-on neutral rail having two legs that extend along the lower portion of the support and a plug-on portion that extends around the upper portion of the support.

2. The apparatus of claim 1, wherein the support is integral with the dielectric shield member, and wherein the neutral rail is configured to receive thereon a plug-on neutral connector of a circuit breaker.

3. The apparatus of claim 1, wherein the neutral rail is snap-fit over the upper portion of the support in a direction along the z-axis such that the two legs straddle the lower portion of the support and the plug-on portion of the neutral rail engages the upper portion.

4. The apparatus of claim 3, wherein the neutral rail includes an angled feature that is angled away from one of the two legs and away from the lower portion of the support toward the upper portion, the apparatus further comprising a first snap fit hook such that the lanced out feature is snap fit to the first snap fit hook when the neutral rail is installed onto the upper portion in the direction along the z-axis.

5. The apparatus of claim 4, wherein the upper portion of the support has a cylindrical feature extending along a length of the support, the plug-on portion of the neutral rail having a rounded inner surface to engage the cylindrical feature of the support in response to the neutral rail being installed thereon.

6. The apparatus of claim 5, wherein the angled feature is a lanced-out feature that becomes trapped under the first snap fit hook in response to the rounded top portion being snap fit onto the cylindrical feature.

7. The apparatus of claim 5, wherein each the legs of the neutral rail has an angled end that is bent away from the lower portion and toward the upper portion, the apparatus further comprising a second snap fit hook opposing the snap fit hook such that the angled ends of the legs of the neutral rail become trapped under the first and second snap fit hooks, respectively, in response to the rounded top portion being snap fit onto the cylindrical feature.

8. The apparatus of claim 4, further comprising a dielectric substrate that includes the first snap fit hook.

9. The apparatus of claim 3, wherein the plug-on portion of the neutral rail has a generally trapezoidal cross section in which a shorter base of the trapezoid is distal from the legs and a longer base of the trapezoid is proximal to the legs, and wherein the upper portion of the support also has a generally trapezoidal cross section having dimensions to permit the plug-on portion to be snap-fit onto the upper portion and retained thereon by the respective geometries of the trapezoidal cross sections.

10. The apparatus of claim 3, wherein a first of the two legs is shorter than a second of the two legs, the support including a first leg retention feature into which the first leg is received, the apparatus further comprising a second leg retention feature configured to hold the second leg against the lower portion of the support after the neutral rail is snap fit onto the upper portion of the support.

11. The apparatus of claim 10, further comprising a dielectric substrate that includes the second leg retention feature.

12. The apparatus of claim 10, wherein the dielectric shield member includes the second leg retention feature, and wherein the second leg retention feature is spaced apart from the lower portion and parallel thereto, the second leg retention feature having a leg engaging end having an angled surface that is angled toward the lower portion to permit the second leg of the neutral rail to be bent into snap fit engagement past the angled surface and into a space between the second leg retention feature and the lower portion of the support.

* * * * *